United States Patent
Eickemeyer (10) Patent No.: US 6,931,639 B1
(45) Date of Patent: Aug. 16, 2005

(54) METHOD FOR IMPLEMENTING A VARIABLE-PARTITIONED QUEUE FOR SIMULTANEOUS MULTITHREADED PROCESSORS

(75) Inventor: Richard James Eickemeyer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 09/645,081

(22) Filed: Aug. 24, 2000

(51) Int. Cl.[7] .............................................. G06F 9/46
(52) U.S. Cl. ....................................... 718/104; 712/228
(58) Field of Search ........................... 718/104; 712/228

(56) References Cited

U.S. PATENT DOCUMENTS

| | | | | |
|---|---|---|---|---|
| 5,790,852 A | * | 8/1998 | Salm ........................... 709/104 |
| 5,922,057 A | * | 7/1999 | Holt ............................. 710/52 |
| 6,205,519 B1 | * | 3/2001 | Aglietti et al. ............... 711/133 |
| 6,219,728 B1 | * | 4/2001 | Yin .............................. 710/52 |
| 6,470,415 B1 | * | 10/2002 | Starr et al. ................... 711/104 |
| 6,694,388 B1 | * | 2/2004 | Schzukin et al. ............. 710/52 |

* cited by examiner

Primary Examiner—Meng-Al T. An
Assistant Examiner—George Opie
(74) Attorney, Agent, or Firm—Joan Pennington (57) ABSTRACT

A method and apparatus are provided for implementing a variable-partitioned queue for simultaneous multithreaded processors. A value is stored in a partition register. A queue structure is divided between a plurality of threads responsive to the stored value in the partition register. When a changed value is received for storing in the partition register, the queue structure is divided between the plurality of threads responsive to the changed value.

15 Claims, 12 Drawing Sheets

FIG. 8
ADDITIONAL ACTIONS FOR EXPANDING THREAD ALGORITHM FOR ADVANCING TAIL

FIG. 9

ADDITIONAL ACTIONS FOR EXPANDING THREAD ALGORITHM FOR FLUSH DUE TO OTHER REASON

FIG. 10
EXPANDING THREADS

FIG. 12

METHOD FOR IMPLEMENTING A VARIABLE-PARTITIONED QUEUE FOR SIMULTANEOUS MULTITHREADED PROCESSORS

FIELD OF THE INVENTION

The present invention relates generally to the data processing field, and more particularly, relates to a method and apparatus for implementing a variable-partitioned queue for simultaneous multithreaded processors.

DESCRIPTION OF THE RELATED ART

In a simultaneous multithreaded out-of-order processor, multiple queues are used to maintain an in-order appearance of execution. For example, such queues can include a load reorder queue (LRQ), a store reorder queue (SRQ), and a global completion table (GCT). Other designs may have more or fewer queues like the LRQ, SRQ and GCT. In the simultaneous multithreaded (SMT) processor, these structures or queues must be designed to allow each thread to operate independently of the other threads. Otherwise, stalls on one thread could delay another thread, which would severely reduce the benefit of the SMT processor.

Sharing each queue among the threads provides the best theoretical performance. However, such an implementation can be complicated and may comprise cycle time, or add to design and verification complexity. If each thread has its own queue of each type, such as the LRQ, SRQ and GCT, there are advantages due to this simple organization. For example, in a two thread design, each thread may have its own SRQ of size 16, for 32 total entries. However, this arrangement can result in a performance loss to the lack of flexibility. Furthermore, if only one thread is running, or if the threads are running at different priorities, the queues would be better organized in a different manner. For example, providing the 32 total entries for the only one thread running or 32+0; or providing the high priority thread with 24 entries and the lower priority thread with 8 entries or 24+8.

A need exists for a mechanism implementing a variable-partitioned queue for simultaneous multithreaded processors.

SUMMARY OF THE INVENTION

A principal object of the present invention is to provide a method and apparatus for implementing a variable-partitioned queue for simultaneous multithreaded processors. Other important objects of the present invention are to provide such method and apparatus for implementing a variable-partitioned queue for simultaneous multithreaded processors substantially without negative effect and that overcome many of the disadvantages of prior art arrangements.

In brief, a method and apparatus are provided for implementing a variable-partitioned queue for simultaneous multithreaded processors. A value is stored in a partition register. A queue structure is divided between a plurality of threads responsive to the stored value in the partition register. When a changed value is received for storing in the partition register, the queue structure is divided between the plurality of threads responsive to the changed value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
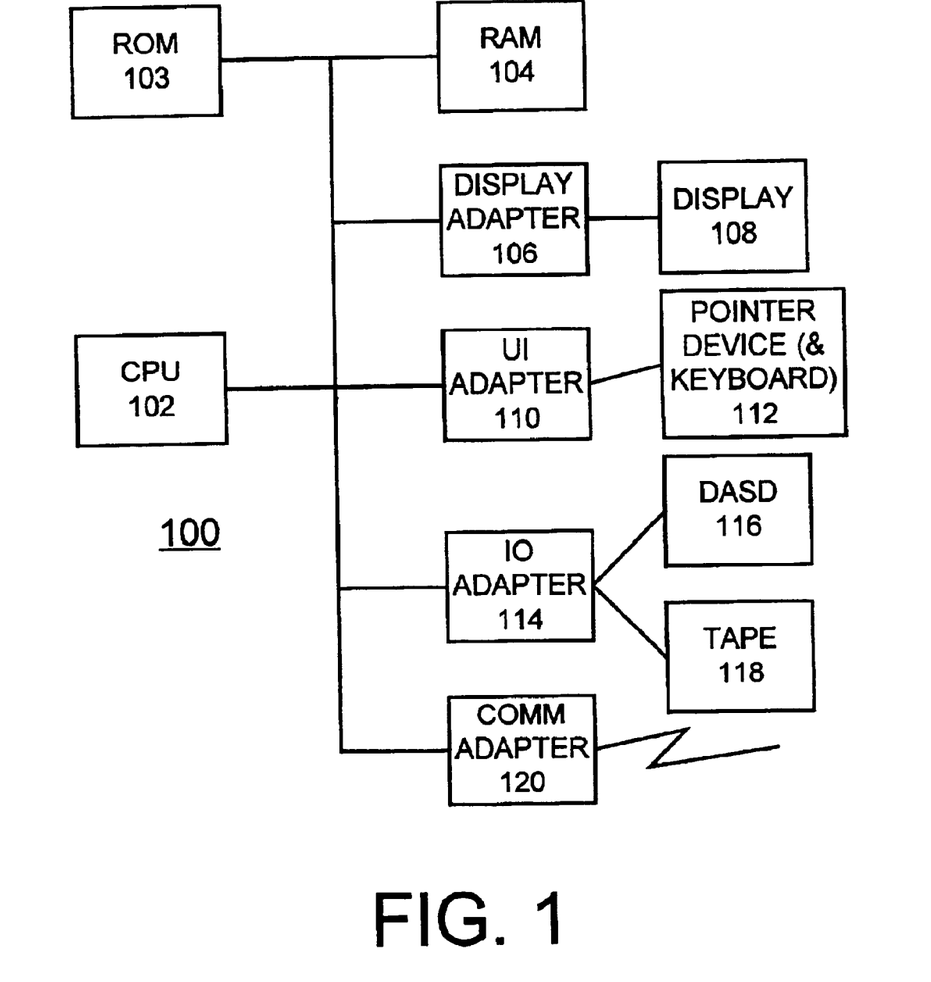
FIG. 1 is a block diagram representation illustrating a computer system for implementing a variable-partitioned queue for simultaneous multithreaded processors in accordance with the preferred embodiment.
Figure 2:
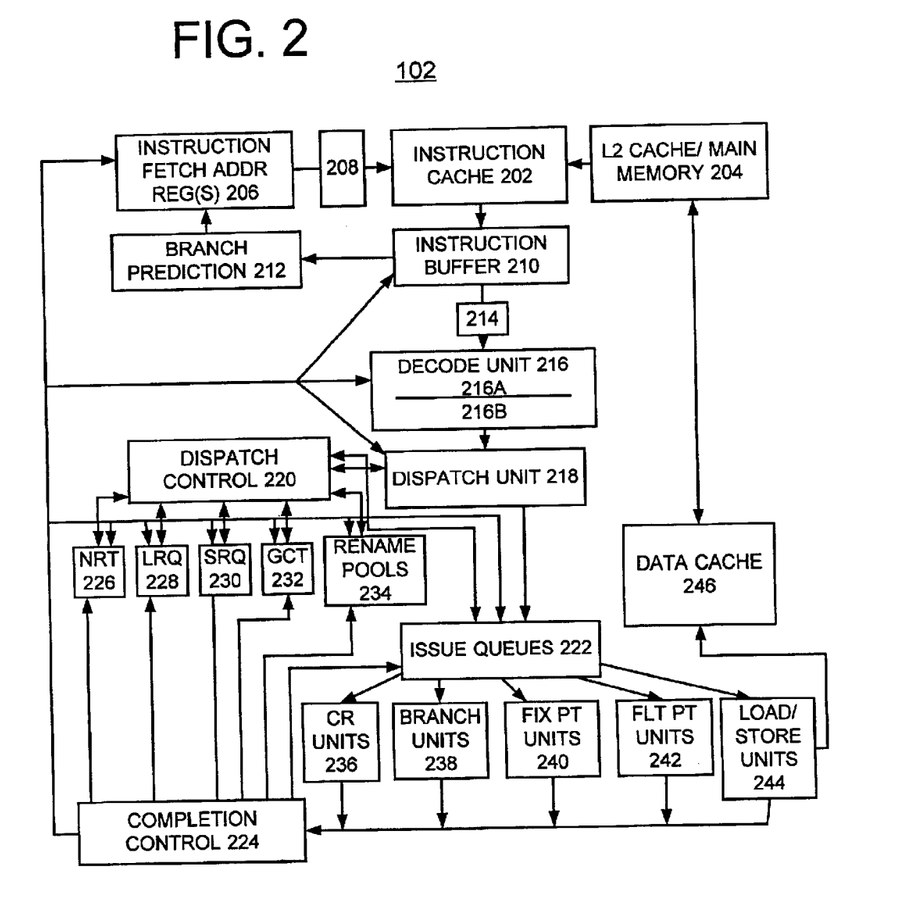
FIG. 2 is a block diagram representation illustrating a computer processing unit for implementing a variable-partitioned queue based upon thread priority in accordance with the preferred embodiment.

Having reference now to the drawings, in FIGS. 1 and 2, there is shown a computer or data processing system generally designated by the reference character 100 for carrying out the limited time advertisement method of the preferred embodiment. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function.

CPU 102 is a general purpose programmable simultaneous multithread processor, executing instructions in memory 104. It should be understood that the present invention is not limited to a computer model with a single CPU with multithread capabilities, or other single component architectures as shown in FIG. 1. It should be understood that computer systems having multiple CPUs, some of which may not have multithread capabilities, are common in servers and can be used in accordance with principles of the invention as long as one CPU has simultaneous multithreading capabilities. Computer 100 may be implemented using any suitable computer, such as an IBM RS/6000 computer running the AIX operating system.

As shown in FIG. 2, multithreaded processing unit 102 includes an instruction cache 202 coupled to a L2 cache and a main memory 204. L2 cache and main memory 204 is shown as a single unit for simplicity. The number of cache levels is not important because the utility of the present invention is not limited to the details of a particular memory arrangement. Instructions for the threads in the pipeline are fetched into the instruction cache 202 from the L2 cache and main memory 204. Address tracking and control to the instruction cache 202 is provided by an instruction fetch address register 206 having one or more addresses per thread. As shown, a thread select 208 is interposed between the instruction fetch address register 206 and the instruction cache 202 for selection of a particular thread pertaining to a particular address. Instructions are forwarded from the instruction cache 202 to an instruction buffer 210 where evaluation of branch conditions occurs in conjunction with a branch prediction logic 212. A second thread select 214 is interposed between the instruction buffer 210 and a decode unit 216 for selecting instructions for a particular thread to be output to the decode unit 216. Decode unit 216 may require multiple cycles to complete its decode function and may have multiple pipelines 216A, 216B. Instructions are forwarded from the decode unit 216 to a dispatch unit 218. A dispatch control 220 provides control signals to the dispatch unit 218. At the dispatch unit 218 of the processor pipeline, resources, queues, and renamed pools are checked to determine availability for instructions within the dispatch unit 218. The dispatch control 220 and the dispatch unit 218 control the dispatch of instructions to a plurality of issue queues 222.

In a multithread processor pipeline, for a given processor clock cycle an instruction from one thread is dispatched from the dispatch unit 218 to the issue queues 222. One or more of the issue queues 222 may include more than one thread per queue, or one thread per issue queue. Issue queues 222 receive control signals from a completion control logic 224, and from a combination of queues which may include, but are not limited to, a non-renamed register tracking (NRT) mechanism 226, a load reorder queue (LRQ) 228, a store reorder queue (SRQ) 230, a global completion table (GCT) 232, and a rename pools 234. In accordance with features of the invention, the LRQ 228, SRQ 230, and GCT 232 can be variably partitioned between threads. Instructions are tracked in the GCT to maintain the order of instructions. The LRQ 228 and SRQ 230 maintain the order of the load and store instructions, respectively, and maintain addresses for the program order. The NRT 226 tracks instructions in registers such as special purpose registers. The instructions are dispatched on another machine cycle to a designated execution unit, such as one or more of a condition register (CR) units 236, a branch units 238, a fixed point units 240, a floating point units 242, or a load/store units 244 which load and store data from and to a data cache 246.

Figure 3:
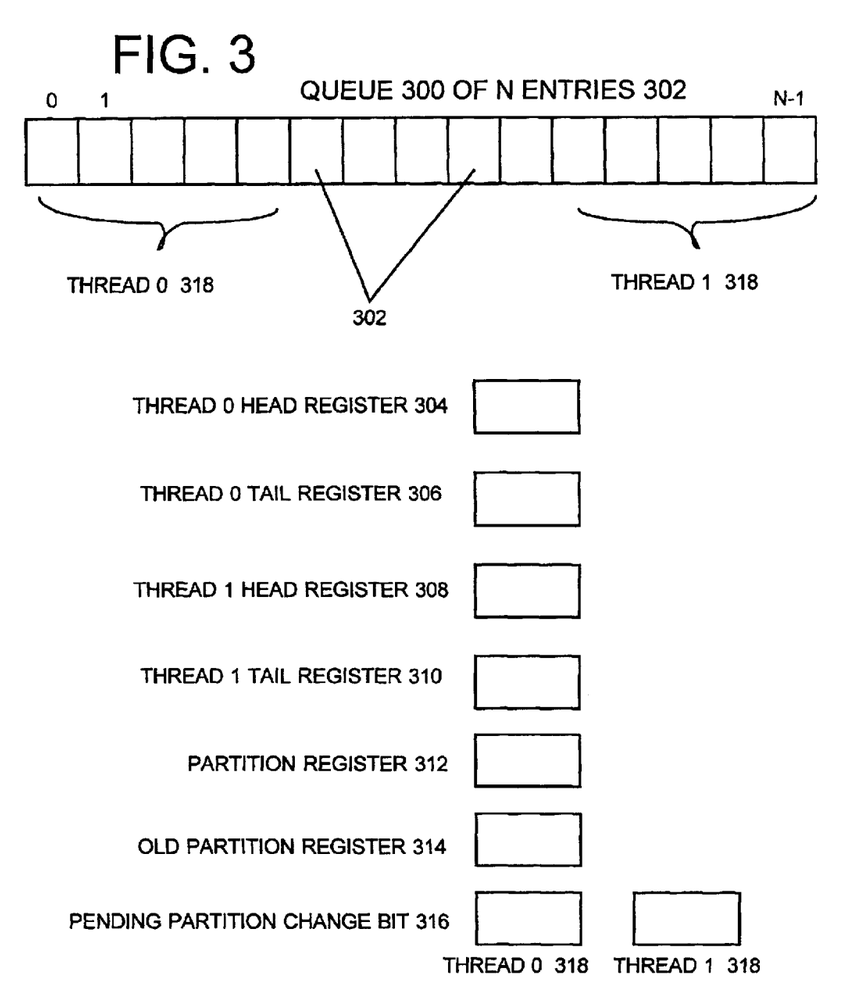
FIG. 3 is a diagram illustrating an exemplary queue structure and registers in accordance with the preferred embodiment.

Referring to FIG. 3, there are shown an exemplary queue structure having a plurality N of entries 302 together with a plurality of registers 304, 306, 308, 312, 314 and 316 in accordance with the preferred embodiment. Each entry 302 of the queue structure 300 is associated with one of a respective thread 0, 318 and a thread 1, 318. Register 304 stores a thread 0 head entry and register 306 stores a thread 0 tail entry. Register 308 stores a thread 1 head entry and register 310 stores a thread 1 tail entry. Register 312 is a partition register storing a variable for making a variable partition of the queue 300. Registers 314 and 316 are registers for storing an old variable for making the variable partition of the queue 300 and a pending partition change bit for each thread 0 318 and thread 1 318, respectively. While two threads are shown in FIG. 3, it should be understood that the queue structure 300 can be partitioned among more than two threads by providing additional registers 304, 306, 308, 312, 314 and 316.

In accordance with features of the invention, methods and apparatus are provided for implementing a variable-partitioned queue 300 for simultaneous multithreaded processors. The single queue structure 300 is partitioned among the threads 318. The partition is made variable by storing in the partition register 312 an index of the entry that divides the structure 300 into a part for each thread 318. For example, with two threads 0 and 1, 318 and 32 total entries, the 6-bit partition register 312 would be set to the first register of thread 1, 318 or to 16 to indicate that the first thread 0, 318 uses locations 0–15 and the second thread 1, 318 uses 16–31. If the processor 102 is running in a single-thread mode, then the partition register 312 is set to 0 indicating the first thread 0, 318 uses no entries and the second thread 1, 318 uses entries 0–31. Alternatively, the partition register 312 is set to 32 indicating the first thread 0, 318 uses entries 0–31 and the second thread 1, 318 uses no entries. A 6-bit partition register 312 is needed because there are 33 possible splits.

In accordance with features of the invention, it should be noted that the number of different partitions to be supported is likely to be smaller than all 33 possible splits. For example, 0+32, 8+24, 16+16, 24+8, 32+0 is one possible set to support a single thread as the second thread 318, the second thread 318 as higher priority than the first thread 318, equal priorities of the first and second threads 318, the first thread 318 as higher priority than the second thread 318, and a single thread as the first thread 318, respectively. This set can be used to reduce the size of the partition register 312.

Figure 4:
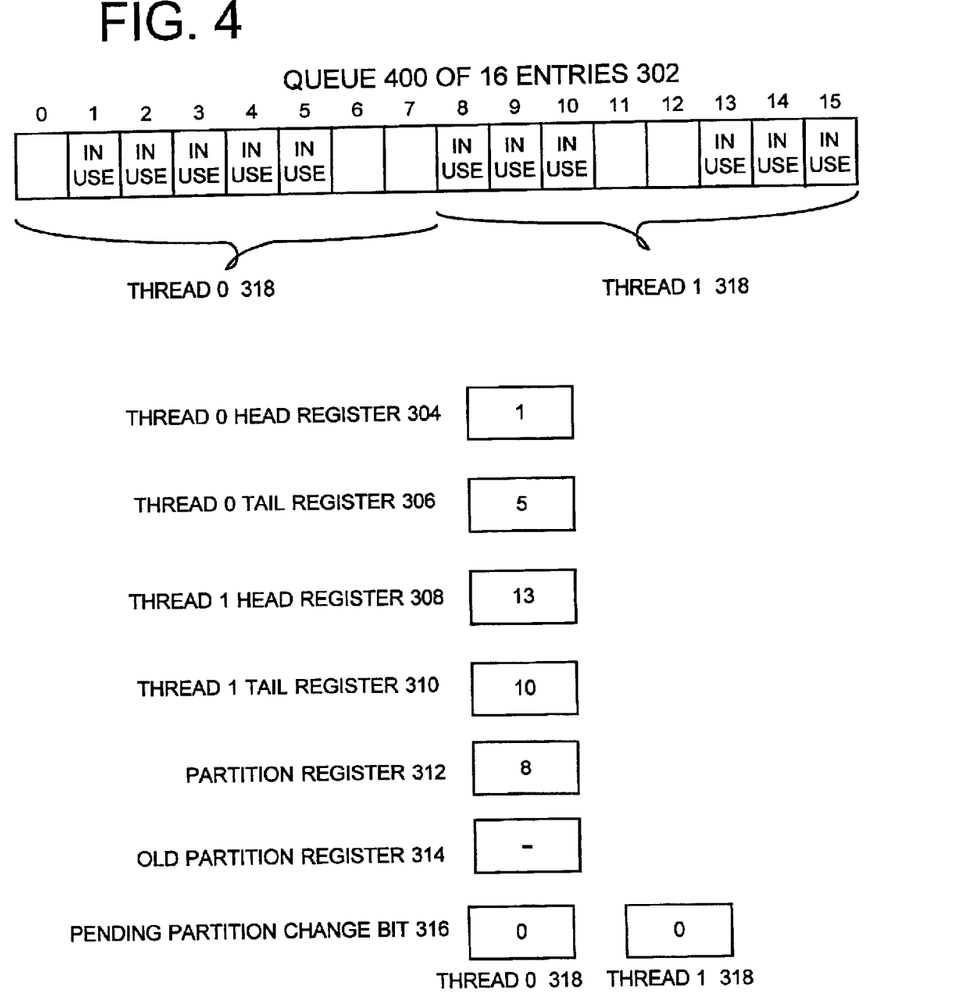
FIG. 4 is a diagram illustrating an example queue structure and register entries in accordance with the preferred embodiment.

FIG. 4 is a diagram illustrating an example queue structure 400 and entries in registers 304, 306, 308, 312, 314 and 316 in accordance with the preferred embodiment. As shown in FIG. 4, the partition register 312 is set to 8 to indicate that the first thread 0, 318 uses entries 0–7 and the second thread 1, 318 uses entries 8–15. Thread 0 head register 304 is set to 1 and thread 0 tail register 306 is set to 5. Thread 1 head register 308 is set to 13 and thread 1 tail register 310 is set to 10. The old partition register 314 is not set and the pending partition change bit 316 is set to 0. The tail points to the oldest entry 302 in a thread 318 and the head points to the youngest entry in a thread 318. Head and tail are normally decremented or moved left. When the oldest entry is done, the tail is decremented by one. When a new entry is allocated, the head is decremented by one. When at the smallest value possible for a thread 318, the pointer is not decremented but is changed to point to the highest possible value for the thread 318. As shown in FIG. 4, the thread 0 is not wrapped and the thread 1 is wrapped with the thread 1 head at entry 13 and the thread one tail at entry 10. A thread is wrapped if the thread tail is less than the thread head. As shown in FIG. 4, the first thread 0, 318 and the second thread 1, 318 use an equal number of entries. By changing the partition register 312 set to 6, then thread 0, 318 uses entries 0–5 and is a shrinking thread in this change of partition register and thread 1, 318 uses entries 6–15 and is an expanding thread in this change of partition register.

In accordance with features of the invention, a selection of a single thread mode or a multiple thread mode is made at the time of an initial program load (IPL). The partition register 312 is set to indicate a division of the entries between the threads. During operation a thread 318 may be removed from or added to the processor 102 and the partition may be changed. To remove one of two threads 318 requires that software notify the hardware that the thread is removed, such as by setting a special purpose register (SPR), or by using a new instruction. To change one thread 318 to a higher priority or to change the other thread 318 to a lower priority, an instruction is issued by software. A simple method of changing the partitioning of the threads 318 is to flush both threads, in response to the software indication, then change the value of the partition register 312 and then resume fetching instructions from each thread 318, if priorities changed, or resume the single selected thread 318 if one thread is disabled. Similarly, if a new thread 318 is added, the current thread is flushed, the partition register 312 is changed, and both threads 318 resume. A flush is the act of discarding some or all queue entries for a thread 318. If only some queue entries are discarded, it will be all those younger than a specific entry. After a flush new entries (possibly the same entries that were flushed) will be allocated as normal.

In accordance with features of the invention, when a thread 318 is changed to a high priority, only the thread 318 having its relative priority lowered is flushed. Flushing both threads to change the partition register 312 has a drawback in that when a thread 318 is changed to a high priority, flushing that thread 318 only slows it down. If both threads 318 are at a medium priority and one thread 0, 318 is set to high, then the other thread 1, 318 is flushed. If both threads 318 are at a medium priority and one thread 0, 318 is set to low, then that thread 0, 318 is flushed. If one thread 0, 318 is set at a medium priority and the other thread 1, 318 set at a low priority is changed to a medium priority, then the one thread 0, 318 that remains at a medium priority is flushed. The partition register 312 is changed after the flush and the flushed thread 318 is resumed.

For example, as shown in FIG. 4, if the thread 318 that was not flushed occupied a set of entries 302 that did not wrap around the end of its former area, for example, thread head equals one (head=1) and thread tail equals five (tail=5); (assuming allocation at head, deallocation at tail, decrement to allocate/deallocate) then this thread 318 can immediately use the new entries 302. If the thread 318 occupied entries 302 that wrapped, thread head equals thirteen (head=13) and thread tail equals ten (tail=10), then this thread 1, 318 cannot immediately use the new space. Using a combination of two distinct solutions provides the best overall solution. The first solution is to flush part of the thread 318 such that the thread no longer wraps. Such as, flush entries 13–15, so that now thread head equals eight (head=8) and the thread tail equals ten (tail=10). The next allocated entry 302 would be seven (7), if the thread 318 were given ten (10) entries total. The second solution is not to flush at the thread head but to wait for the thread tail to deallocate normally. The partition register 312 is set to six (6). The old partition register 314 is set to eight (8) and the pending partition change bit 318 for thread 1, 318 is set to one. When the thread tail wraps past 8 and goes to 15, the thread 1, 318 no longer wraps, the pending partition change bit 316 for the thread is set to zero, and the old partition register 314 no longer applies. While the pending partition change bit is one, that thread uses the old partition register 314. While the pending partition change bit is zero, that thread uses the partition register 312.

The combination of the two distinct solutions is to determine which solution is best to apply in a given instance. One possible way to determine the algorithm is to determine if the number of wrapped entries 302 at the head is greater than a predefined number, then there is no flush and the thread tail deallocation will unwrap. If the number of wrapped entries 302 at the head is less than a predefined number, then the entries at the head are flushed to unwrap. There are other algorithms that can alternatively be used, such as the position of the tail pointer which is an indication of how long it may take before the tail naturally unwraps. Note that in the no flush case, there can still be a flush due to some unrelated cause, for example, branch misprediction, that would also unwrap the pointers. This also clears the pending bit 316 for this thread 318.

In accordance with features of the invention, it should be noted that the thread 318 that is getting fewer queue entries or shrinking, and is being flushed, does not have to be completely flushed. If the thread 318 is not using the entries 302 that it is losing, no flush is needed. If the thread tail or deallocation point is within these entries, then the entire thread 318 is flushed; otherwise only part of the thread is flushed to clear out the entries 302 that are being lost, starting from the thread head. This is an issue when a low priority thread 318 is increasing to medium and the other thread 318 is high. It is preferable not to flush the high priority thread.

Figure 5:
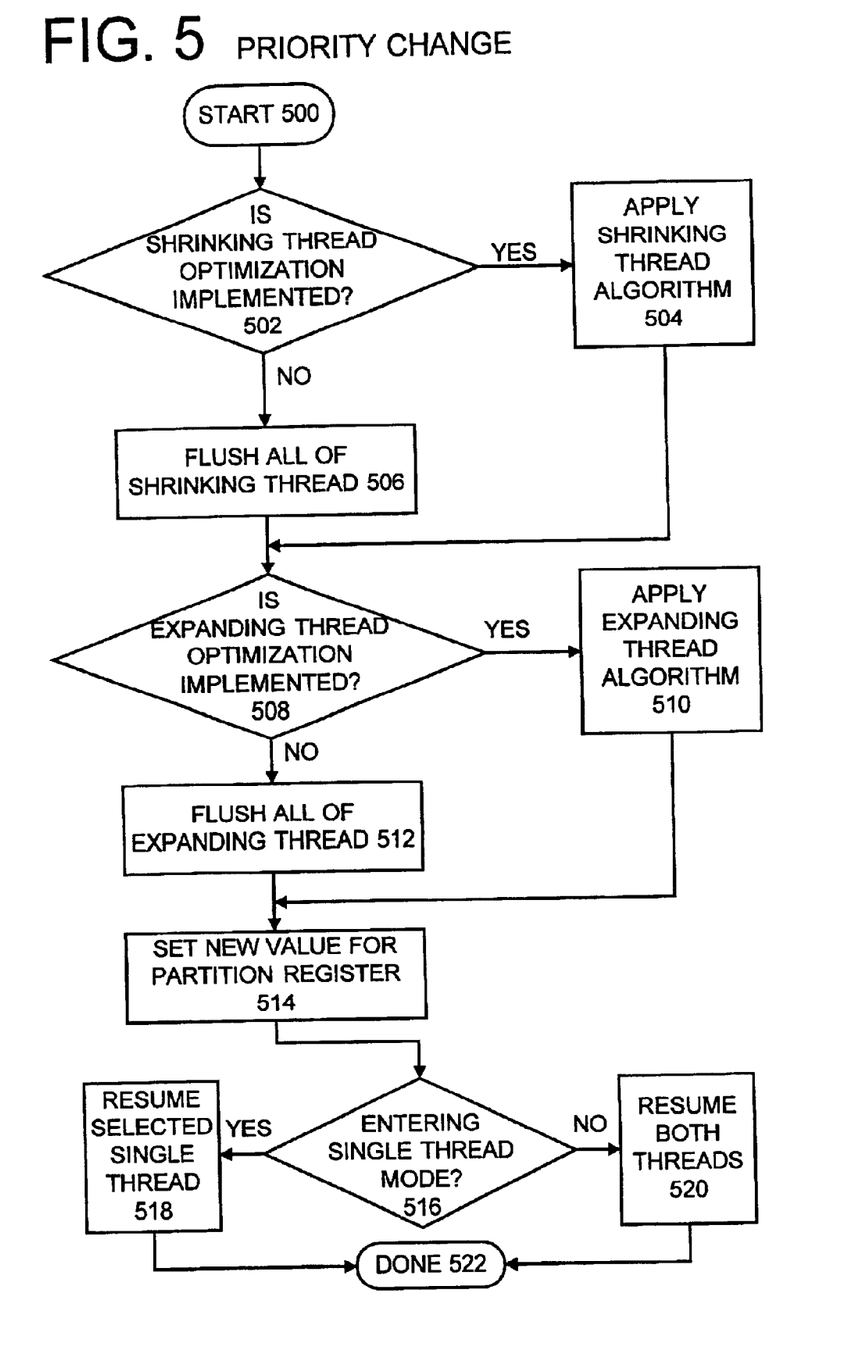
FIG. 5 is a flow chart illustrating exemplary sequential steps for implementing a variable-partitioned queue based upon thread priority with a priority change in accordance with the preferred embodiment.

FIG. 5 is a flow chart illustrating exemplary sequential steps for implementing partitioned queues per thread and a variable-partitioned queue based upon thread priority with a priority change in accordance with the preferred embodiment starting at a block 500. It should be understood that there are different implementations of the variable partitioned queue algorithm as described above. For example, if an apply tail advance algorithm is not implemented, the old partition register 314 and the pending partition change bit 316 are not needed. FIG. 5 provides a guide to which algorithm is implemented in a particular processor design. Checking whether a shrinking thread optimization is implemented is performed as indicated in a decision block 502. When determined that a shrinking thread optimization is implemented, then a shrinking thread algorithm is applied as indicated in a block 504. The shrinking thread algorithm is illustrated and described with respect to FIG. 6. Otherwise, when determined that a shrinking thread optimization is not implemented, then all of the shrinking thread is flushed as indicated in a block 506. Checking whether an expanding thread optimization is implemented is performed as indicated in a decision block 508. When determined that an expanding thread optimization is implemented, then an expanding thread algorithm is applied as indicated in a block 510. The shrinking thread algorithm is illustrated and described with respect to FIG. 7. Otherwise, when determined that an expanding thread optimization is not implemented, then all of the expanding thread is flushed as indicated in a block 512. A new value is set for the partition register as indicated in a block 514. Checking whether entering a single thread mode is performed as indicated in a decision block 516. When entering a single thread mode, then the selected single thread is resumed as indicated in a block 518. When not entering a single thread mode, then both threads are resumed as indicated in a block 520. This completes the sequential operations as indicated in a block 522.

Figure 6:
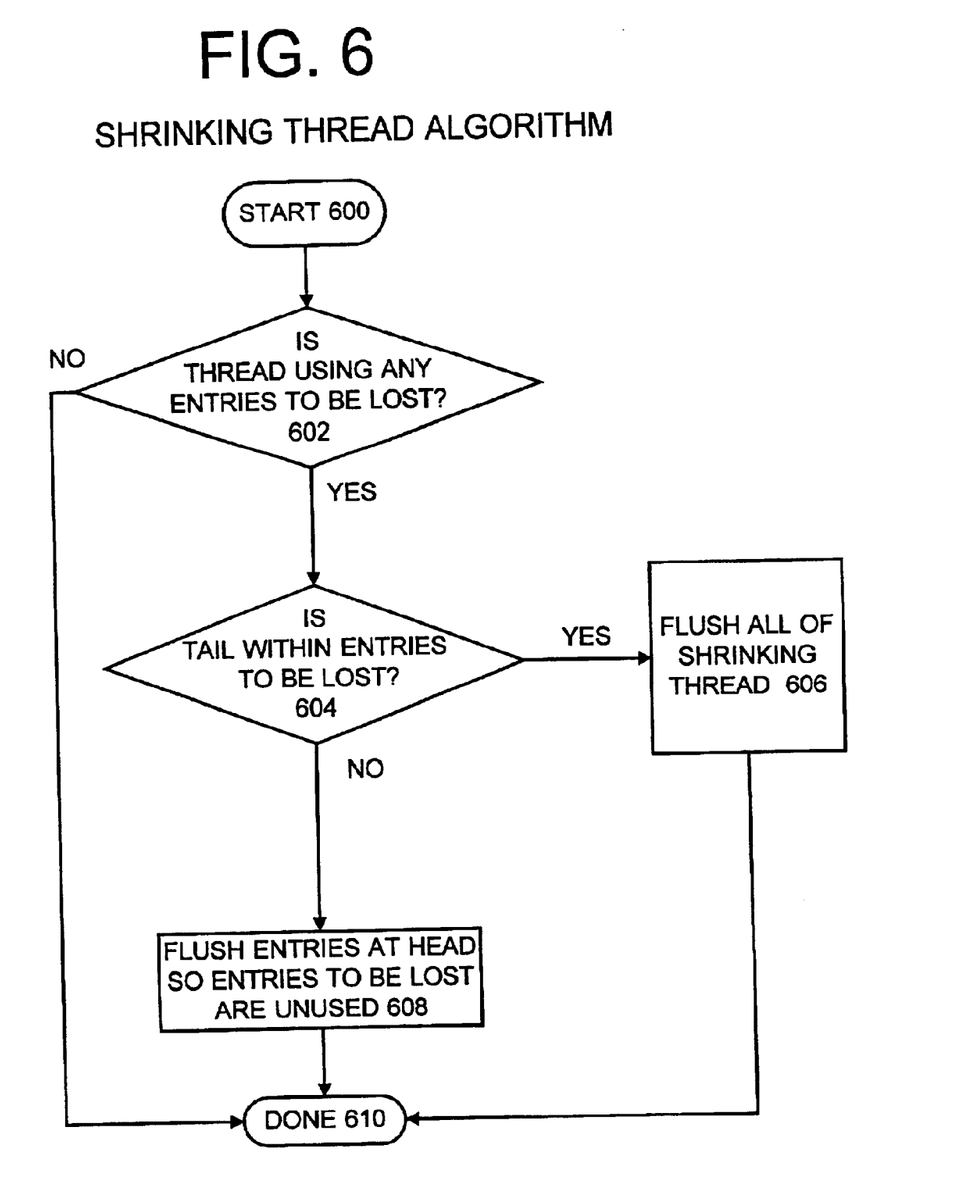
FIG. 6 is a flow chart illustrating exemplary sequential steps for implementing a shrinking thread algorithm in accordance with the preferred embodiment.
Figure 11:
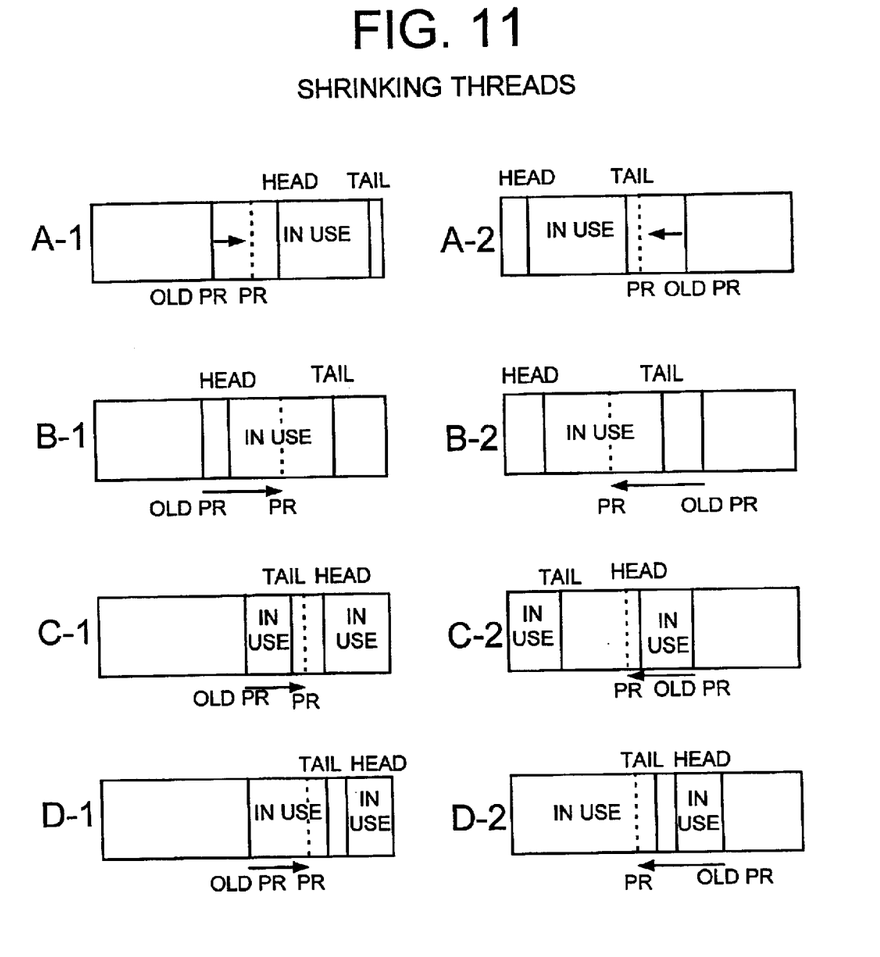
FIG. 11 is a chart illustrating exemplary shrinking thread examples in accordance with the preferred embodiment.

Referring to FIGS. 6 and 11, a shrinking thread algorithm in accordance with the preferred embodiment may be understood. FIG. 11 illustrates eight exemplary shrinking thread examples A-1, A-2, B-1, B-2, C-1, C-2, D-1, D-2. FIG. 6 illustrates exemplary sequential steps for implementing a shrinking thread algorithm in accordance with the preferred embodiment starting at a block 600. Checking whether thread is using any entries to be lost is performed as indicated in a decision block 602. With no entries to be lost as shown in the shrinking thread examples A-1, A-2 of FIG. 11, then the sequential operations are completed as indicated in a block 610. With entries to be lost as shown in the shrinking thread examples B-1, B-2, C-1, C-2, D-1, D-2 of FIG. 11, then checking whether the tail is within entries to be lost as indicated in a decision block 604. When the tail is within entries to be lost as shown in the shrinking thread examples B-2, C-1, D-2 of FIG. 11, then all of the shrinking thread is flushed as indicated in a block 606. When the tail is not within entries to be lost as shown in the shrinking thread examples B-1, C-2, D-1 of FIG. 11, then entries at the head are flushed so entries to be lost are unused as indicated in a block 608. This completes the sequential operations at block 610.

Figure 7:
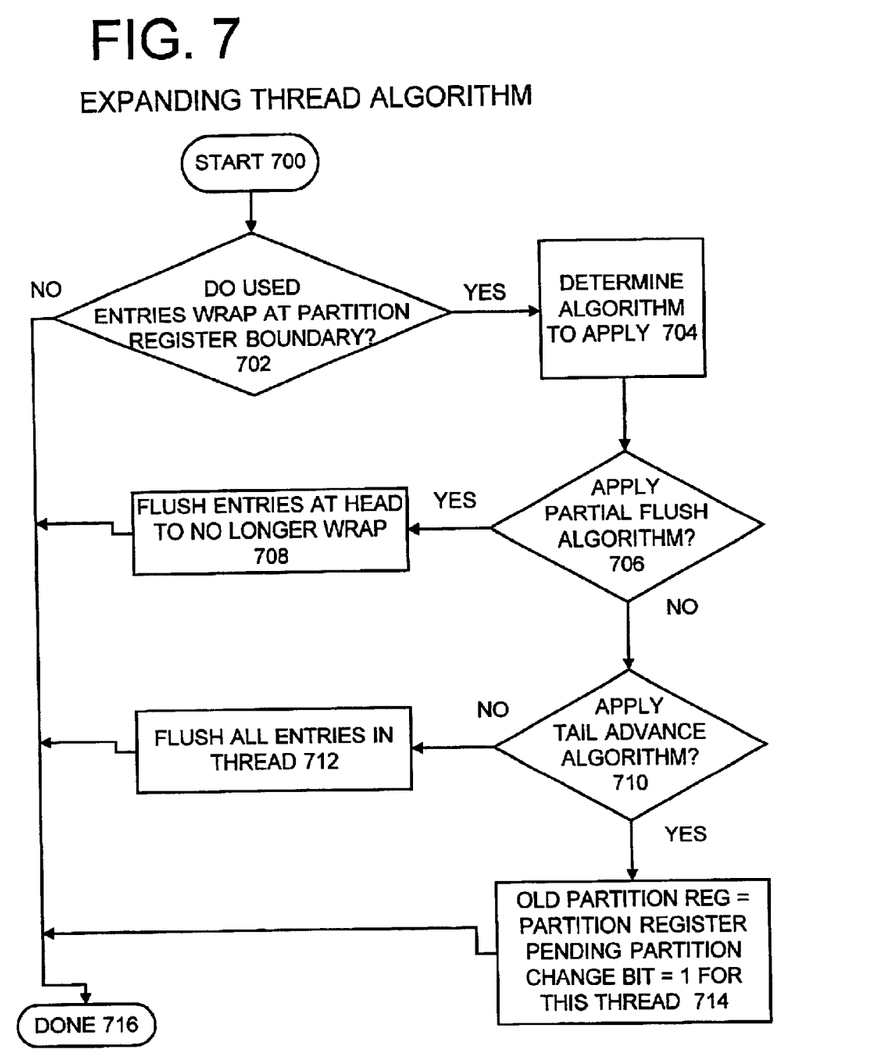
FIG. 7 is a flow chart illustrating exemplary sequential steps for implementing an expanding thread algorithm in accordance with the preferred embodiment.
Figure 10:
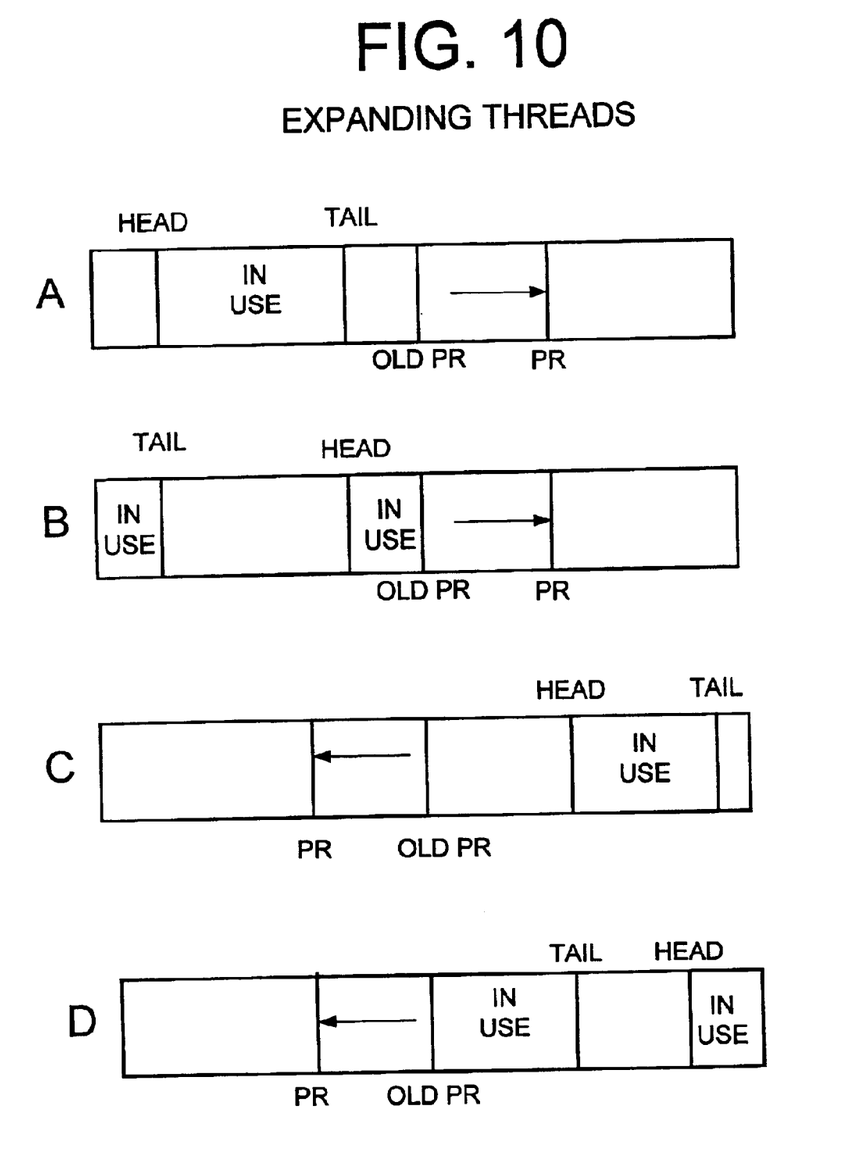
FIG. 10 is a chart illustrating exemplary expanding thread examples in accordance with the preferred embodiment.

Referring to FIGS. 7 and 10, an expanding thread algorithm in accordance with the preferred embodiment may be understood. FIG. 10 illustrates four exemplary expanding thread examples A, B, C, D. FIG. 7 illustrates exemplary sequential steps for implementing an expanding thread algorithm in accordance with the preferred embodiment starting at a block 700. Checking whether used entries wrap at partition register boundary is performed as indicated in a decision block 702. When used entries wrap at the partition register boundary as shown in FIG. 10, B and D, then an algorithm to apply is determined as indicated in a block 704, such as a partial flush algorithm at the thread head. Otherwise when used entries do not wrap at the partition register boundary as shown in FIG. 10, A and C, then the sequential operations end as indicated in a block 716. Checking whether to apply a partial flush algorithm is performed as indicated in a decision block 706. When determined to apply a partial flush algorithm, for example, with B in FIG. 10, then the entries at the thread head are flushed to no longer wrap as indicated in a block 708. Otherwise checking whether to apply a tail advance algorithm is performed as indicated in a decision block 710. When determined not to apply a tail advance algorithm, all entries in the thread 318 are flushed as indicated in a block 712. When determined to apply a tail advance algorithm for example, with D in FIG. 10, then the old partition register 314 is set equal to the value of partition register 312 and the pending partition change bit 316 for this thread 318 is set to one as indicated in a block 714. Sequential exemplary steps for the tail advance algorithm are illustrated and described with respect to FIG. 8. Then the sequential operations are completed at block 716.

Figure 8:
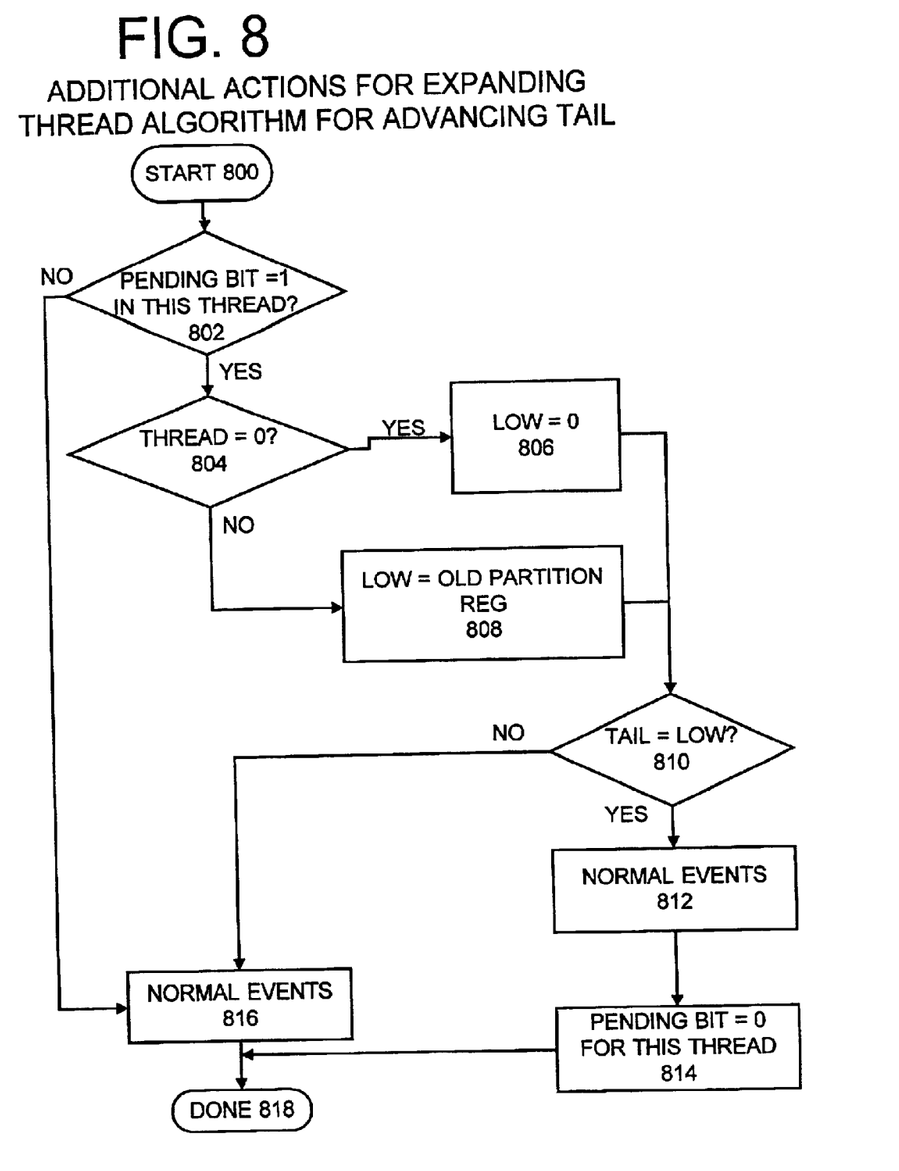
FIG. 8 is a flow chart illustrating exemplary additional sequential steps for implementing an expanding thread algorithm with advancing thread tail in accordance with the preferred embodiment.

FIG. 8 illustrates exemplary additional sequential steps for implementing an expanding thread algorithm with advancing thread tail in accordance with the preferred embodiment starting at a block 800. This is applied sometime after the partition register 312 is changed. An advancing thread tail is a normal event, such as when the entry at the tail is deallocated. The tail decrements or unwraps. Checking for the pending partition change bit 316 for the thread equal to one is performed as indicated in a block 802. If the pending partition change bit 316 for the thread is not one, then the sequential operations continue with normal events that either decrement or unwrap the thread tail as indicated in a block 816 and the sequential operations are completed at block 818. When the pending partition change bit 316 for the thread is equal to one, then checking whether the expanding thread 318 is thread 0 as indicated in a decision block 804. When the expanding thread 318 is thread 0, then the low entry is set to zero as indicated in a block 806. When the expanding thread 318 is not thread 0 or is thread 1, then the low entry is set to the old partition register 314 value. Next, checking whether the tail is low is performed as indicated in a decision block 810. This checks whether the tail will be decremented or will unwrap. When the tail is low, then the sequential operations continue with normal events (tail unwraps) at block 812. Then the pending partition change bit 316 for this thread is set equal to zero as indicated in a block 814. Then the sequential operations are completed at block 818. When the tail is not low, then the sequential operations continue with normal events (tail is decremented) at block 816 and the sequential operations are completed at block 818.

Figure 9:
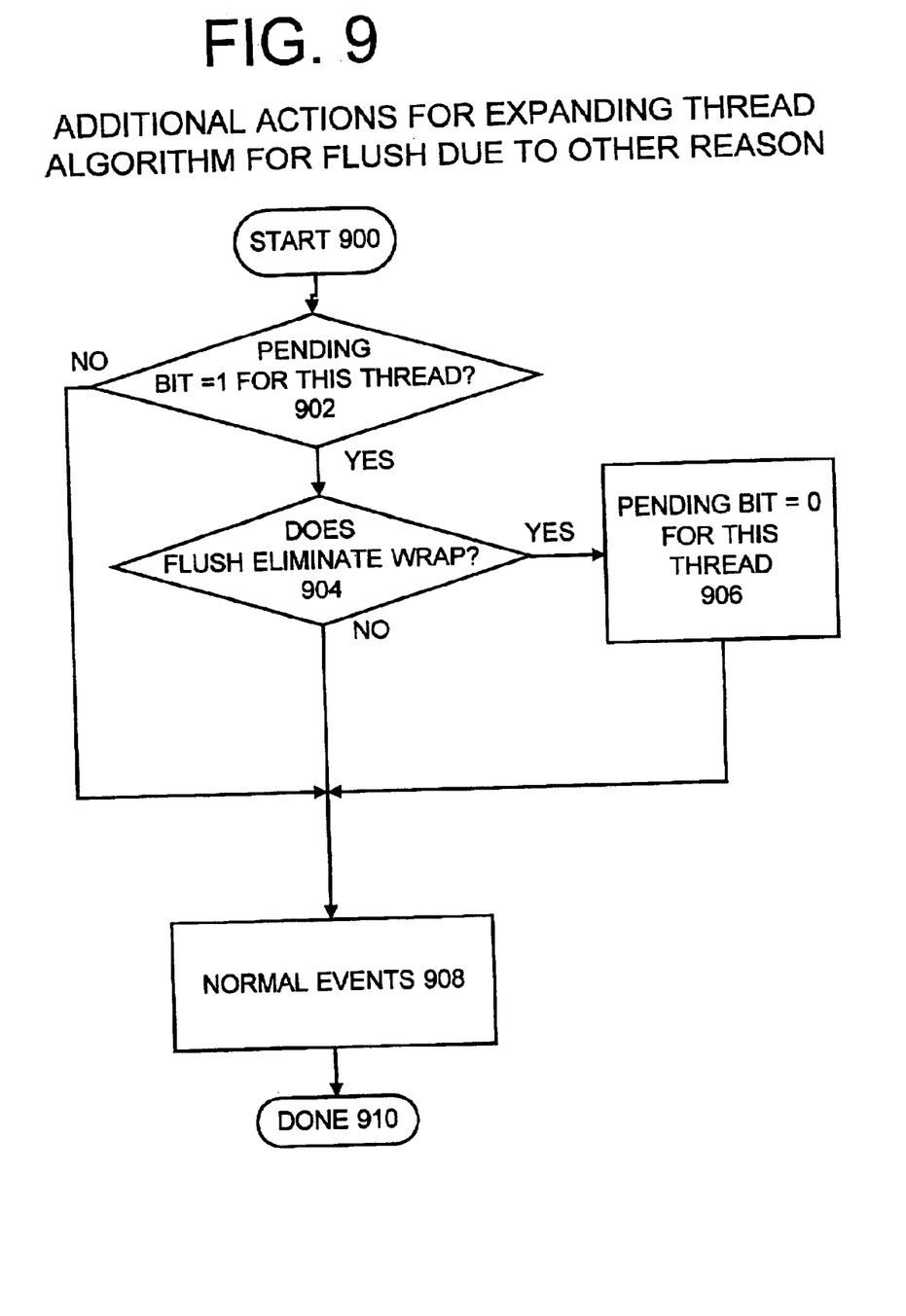
FIG. 9 is a flow chart illustrating exemplary additional sequential steps for implementing an expanding thread algorithm with a thread flush in accordance with the preferred embodiment.

FIG. 9 illustrates exemplary additional sequential steps for implementing an expanding thread algorithm with a thread flush due to some reason other than a change in the queue partition register 312 in accordance with the preferred embodiment starting at a block 900. Examples of flush reasons are a branch mispredict or other conditions in which instructions need to be discarded and the same or other instructions are fetched. Checking for the pending partition change bit 316 equal to one for this thread is performed as indicated in a block 902. If the pending partition change bit 316 for this thread is not one, then the sequential operations continue with normal events as indicated in a block 908 and the sequential operations are completed at block 910. The normal events for the flush are to remove a specified number of entries at the head. The head then points to the now current youngest entry. If the pending partition change bit 316 for this thread is one, then checking whether the flush eliminates wrap as indicated in a decision block 904. If the flush does not eliminate the wrap, then the sequential operations continue with normal events at block 908 and the sequential operations are completed at block 910. If the flush eliminates wrap, then the pending partition change bit 316 for this thread is set to zero as indicated in a block 906. Once the wrap has been eliminated, the expanding thread is now able to use the new entries 302. Then the sequential operations continue with normal events at block 908 and the sequential operations are completed at block 910.

It should be understood that the principles of the present invention apply to other numbers of threads. For example, multiple distinct queues 300, each with two threads 318 can be used and the above-described detailed methods can be used. Alternatively, all threads 318 can reside on a single queue 300 and all thread 318 are flushed on a priority change. Then the partition registers 312 are reset and the threads 318 restarted. Another alternative is to flush all except a highest priority thread 318, then resize its part of the queue 300 using the methods described above, then restart. If multiple threads 318 are equally high priority, then one thread 318 not to flush can be chosen at random, or based upon other heuristics, such as which thread 318 has fewer entries in the GCT 232.

Figure 12:
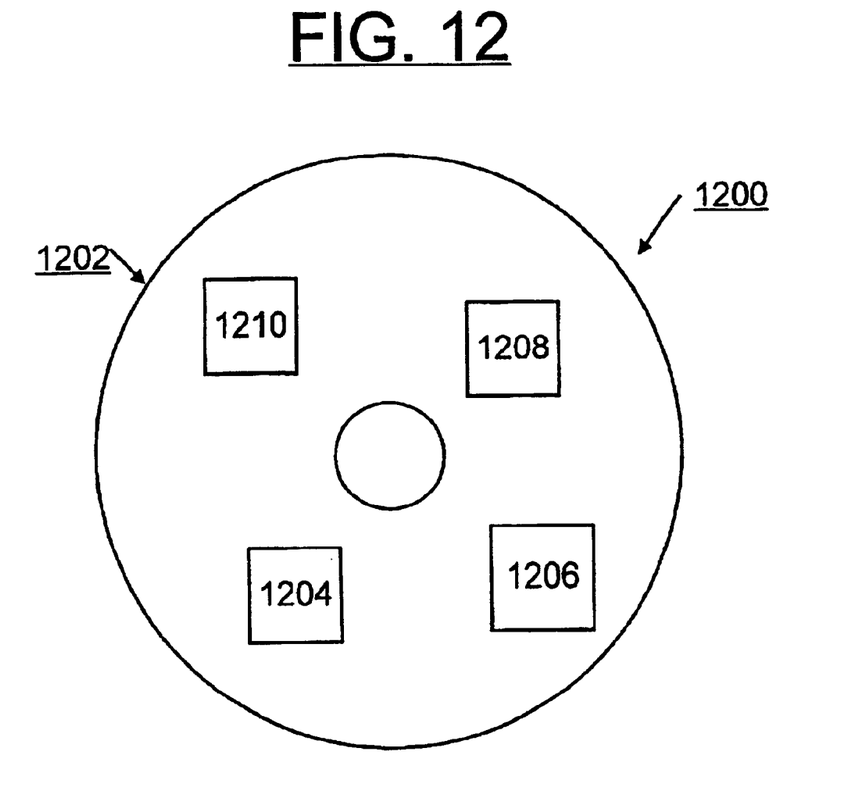
FIG. 12 is a block diagram illustrating a computer program product in accordance with the preferred embodiment.

Referring now to FIG. 12, an article of manufacture or a computer program product 1200 of the invention is illustrated. The computer program product 1200 includes a recording medium 1202, such as, a floppy disk, a high capacity read only memory in the form of an optically read compact disk or CD-ROM, a tape, a transmission type media such as a digital or analog communications link, or a similar computer program product. Recording medium 1202 stores program means 1204, 1206, 1208, 1210 on the medium 1202 for carrying out the methods for implementing partitioned queues per thread and a variable-partitioned queue for simultaneous multithreaded processors of the preferred embodiment in the system 100 of FIG. 1.

A sequence of program instructions or a logical assembly of one or more interrelated modules defined by the recorded program means 1204, 1206, 1208, 1210, direct the computer system 100 for implementing partitioned queues per thread and a variable-partitioned queue for simultaneous multithreaded processors of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing a variable-partitioned queue for simultaneous multithreaded processors comprising the steps of:

storing a value in a partition register;

dividing a queue structure between a plurality of threads responsive to said stored value in said partition register;

receiving a changed value for storing in said partition register; and dividing said queue structure between said plurality of threads responsive to said changed value for storing in said partition register and applying a shrinking thread algorithm including the steps of identifying entries in said queue structure being used by said shrinking thread to be lost responsive to said changed value and checking for a thread tail within said entries to be lost.

2. A computer-implemented method for implementing a variable-partitioned queue for simultaneous multithreaded processors as recited in claim 1 wherein the step of dividing said queue structure between said plurality of threads responsive to said stored value in said partition register includes the steps of dividing said queue structure between a first thread and a second thread responsive to said stored value in said partition register.

3. A computer-implemented method for implementing a variable-partitioned queue for simultaneous multithreaded processors as recited in claim 2 further includes the steps of providing multiple distinct queues, each for dividing between a pair of threads; and providing a respective partition register for use with each of the multiple distinct queues.

4. A computer-implemented method for implementing a variable-partitioned queue for simultaneous multithreaded processors as recited in claim 1 includes the steps of flushing all of said shrinking thread.

5. A computer-implemented method for implementing a variable-partitioned queue for simultaneous multithreaded processors as recited in claim 1 includes the steps responsive to said thread tail being within said entries to be lost, flushing all of said shrinking thread; and responsive to said thread tail not being within said entries to be lost, flushing entries at thread head.

6. A computer-implemented method for implementing a variable-partitioned queue for simultaneous multithreaded processors as recited in claim 1 wherein the step of dividing said queue structure between said plurality of threads responsive to said changed value for storing in said partition register includes the steps of applying an expanding thread algorithm.

7. A computer-implemented method for implementing a variable-partitioned queue for simultaneous multithreaded processors as recited in claim 6 wherein the step of applying said expanding thread algorithm includes the steps of applying a partial flush algorithm.

8. A computer-implemented method for implementing a variable-partitioned queue for simultaneous multithreaded processors as recited in claim 6 wherein the step of applying said expanding thread algorithm includes the steps of applying an advancing tail algorithm.

9. A computer-implemented method for implementing a variable-partitioned queue for simultaneous multithreaded processors as recited in claim 8 wherein the step of applying said expanding thread algorithm includes the steps taken on a flush includes checking if said flush eliminates a wrap; and responsive to said flush eliminating said wrap, setting said pending partition change bit to zero.

10. A computer-implemented method for implementing a variable-partitioned queue for simultaneous multithreaded processors as recited in claim 1 includes the steps of flushing all of an expanding thread.

11. A computer-implemented method for implementing a variable-partitioned queue for simultaneous multithreaded processors comprising the steps of:

storing a value in a partition register;

dividing a queue structure between a plurality of threads responsive to said stored value in said partition register;

receiving a changed value for storing in said partition register;

dividing said queue structure between said plurality of threads responsive to said changed value for storing in said partition register and applying an expanding thread algorithm including the step of applying a partial flush algorithm; and said partial flush algorithm including the step of flushing entries at a thread head so the thread no longer wraps.

12. A computer-implemented method for implementing a variable-partitioned queue for simultaneous multithreaded processors comprising the steps of:

storing a value in a partition register;

dividing a queue structure between a plurality of threads responsive to said stored value in said partition register;

receiving a changed value for storing in said partition register;

dividing said queue structure between said plurality of threads responsive to said changed value for storing in said partition register and applying an expanding thread algorithm including the step of applying an advancing tail algorithm; and said advancing tail algorithm including the steps of setting a pending partition change bit for the thread to one and setting an old partition register to said value in said partition register.

13. A computer-implemented method for implementing a variable-partitioned queue for simultaneous multithreaded processors as recited in claim 12 wherein said advancing tail algorithm includes the steps of identifying if said pending partition change bit is one, identifying if said thread tail is about to unwrap, and responsive to said thread tail being about to unwrap, setting said pending partition change bit to zero.

14. A computer-implemented method for implementing a variable-partitioned queue for simultaneous multithreaded processors as recited in claim 13 wherein said step, identifying if said thread tail is about to unwrap includes the steps of identifying a low entry for said expanding thread, and checking if said thread tail of said expanding thread is low.

15. A computer program product for implementing a variable-partitioned queue for simultaneous multithreaded processors in a computer system including a central processor unit, said computer program product including a plurality of computer executable instructions stored on a computer readable medium, wherein said instructions, when executed by said central processor unit, cause the central processor unit to perform the steps of:

storing a value in a partition register;

dividing a queue structure between a plurality of threads responsive to said stored value in said partition register;

receiving a changed value for storing in said partition register;

dividing said queue structure between said plurality of threads responsive to said changed value for storing in said partition register and applying an expanding thread algorithm including the step of applying a partial flush algorithm; and said partial flush algorithm including the step of flushing entries at a thread head so the thread no longer wraps.

* * * * *